United States Patent
Hofheinz (10) Patent No.: US 8,502,496 B2
(45) Date of Patent: Aug. 6, 2013

(54) POWER CHARGING DEVICE FOR AN ELECTRIC VEHICLE

(75) Inventor: Wolfgang Hofheinz, Gruenberg (DE)

(73) Assignee: Bender GmbH & Co. KG (DE)

( * ) Notice: Subject to any disclaimer, the term of this patent is extended or adjusted under 35 U.S.C. 154(b) by 274 days.

(21) Appl. No.: 13/101,542

(22) Filed: May 5, 2011

(65) Prior Publication Data

US 2011/0273139 A1 Nov. 10, 2011

(30) Foreign Application Priority Data

May 5, 2010 (DE) .......................... 10 2010 028 626

(51) Int. Cl.
*H02J 7/14* (2006.01)
*H02J 7/00* (2006.01)

(52) U.S. Cl.
USPC ........... 320/104; 320/109; 320/132; 903/903; 903/907; 180/65.21; 180/65.265

(58) Field of Classification Search
CPC .................................................. Y02T 10/7005
USPC ............................................... 320/104, 109
See application file for complete search history.

(56) References Cited

FOREIGN PATENT DOCUMENTS

| DE | 197 35 412 A1 | 2/1999 |
|---|---|---|
| DE | 694 20 449 T2 | 9/1999 |
| EP | 0 622 265 B1 | 9/1999 |
| JP | 2000-354332 A | 12/2000 |

*Primary Examiner* — Edward Tso
*Assistant Examiner* — Ahmed Omar
(74) *Attorney, Agent, or Firm* — Griffin & Szipl, P.C.

(57) ABSTRACT

The invention relates to a power charging device (10) for an electric vehicle (12) with an electric energy store (14). The power charging device (10) comprises at least one rectifier means (16) for converting a supply voltage (18) into a charging d.c. voltage (20), a contacting means (22) for contacting a plug-in connection supply point (24) of the electric vehicle (12), and a residual current monitoring device (26) for detecting a current difference in the contacting means (22) and/or the electric vehicle (12) during a charging process of the energy store (14) of the electric vehicle (12). The invention is characterized in that the residual current monitoring device (26) is designed at least for detection of a direct current difference $\Delta I$ and comprises a cutoff element (28) which can interrupt the charging process when a predeterminable direct current cutoff difference (36) is exceeded over a predeterminable cutoff time.

13 Claims, 4 Drawing Sheets

POWER CHARGING DEVICE FOR AN ELECTRIC VEHICLE

This is a U.S. Patent Application which claims priority from German Patent Application No. 10 2010 028 626.5, filed May 5, 2010, the entire disclosure of which is incorporated herein by reference.

The invention is based on a power charging device for an electric vehicle with an electric energy store, comprising at least one rectifier means for converting a supply voltage into a charging d.c. voltage, a contacting means for contacting a plug-in connection supply point of the electric vehicle and a residual current monitoring device for detecting a current difference in the contacting means and/or the electric vehicle during a charging process of the energy store of the electric vehicle.

In order to charge an energy store of an electric vehicle, this term being understood to include both electric vehicles driven purely by electricity and also hybrid vehicles which contain an alternate combination of a drive by electricity and a drive by combustion engine, electrical energy is drawn from an energy mains during downtime. The electric vehicle is normally coupled to the mains supply by means of a connection cable which is plugged into a power point, or which is connected to a power charging device, which is also referred to as a charging station. A charge regulator means and any rectifier means and protection means required for this are normally located in the vehicle, in such a way that the vehicle can be charged at any conventional household power point. Charging stations also exist which comprise external charging devices, by means of which specific energy stores of electric vehicles can be charged. Such electric vehicles may be vehicles driven by two wheels, in particular pedelecs, electric mopeds or electric motorbikes, or passenger motor vehicles driven by four wheels as well as heavy goods vehicles and transport vehicles. Electrochemical energy stores such as batteries are generally used as energy stores and both supply with energy one or more electric motors used to drive the vehicle and operate the vehicle electronics. In most cases such electric vehicles are equipped with internal charge regulator means which convert a mains a.c. voltage into a d.c. voltage of a power charging device and thus enable a connection to a household power point in order to provide an adapted charging voltage of the internal electric energy store.

In order to protect individuals against dangerous fault currents in the event of electrical defects in the vehicle electronics, or else in order to protect the vehicle against damage after short circuits, insulation faults or leakage currents, draft standard E DIN IEC 61851-21 (VDE0122-1): 2008-12 "Konduktive Ladesysteme für Elektrofahrzeuge—Teil 1: Allgemeine Anforderungen" stipulates that protection is to be provided in the event of indirect contact by an additional or reinforced insulation, an equipotential bonding, a protective screening, an automatic isolation of the power supply or a simple disconnection. Such protective measures, which are known from the prior art, in the event of indirect contact are hardly sufficient with the extensive use of electric vehicles for ensuring reliable protection of the vehicle occupants and of the technical equipment used. Furthermore, for reasons of weight and efficiency it is to be expected that, in the future, a charging device will be installed outside the vehicle in specifically designed power charging devices known as charging stations. These power charging devices will be connected via a charging cable to the energy store of the electric vehicle in order to charge it by means of d.c. voltage and a controlled charging process. The conventional protective measures presented above, in particular fuse protection by type A residual current devices (RCDs), which can only recognise alternating current differential faults, are not sufficient to ensure comprehensive protection in the event of indirect contact and against damage or destruction of the vehicle electronics, since they fail when it comes to reliable detection of direct current faults or of alternating current faults (the alternating current being superposed by a direct current), as may occur during operation of an electric vehicle. In order to ensure comprehensive protection against direct current, alternating current or mixed fault currents, suitable protective measures have to be provided inside the power charging device which ensure a reliable charging process, prevent accidental cutoff of the charging means and can ensure a high level of passenger protection against electric shock, in such a way that even an external d.c. voltage power charging device can be provided for rapid charging of a vehicle.

DISCLOSURE OF THE INVENTION

In order to overcome the aforementioned drawbacks of the prior art, the invention proposes to provide a power charging device for an electric vehicle with an electric energy store, which device comprises at least one rectifier means for converting a supply voltage into a charging d.c. voltage, a contacting means for contacting a plug-in connection supply point of the electric vehicle, and a residual current monitoring device for detecting a current difference in the contacting means and/or the electric vehicle during a charging process of the energy store of the electric vehicle.

It is proposed that the residual current monitoring device is designed at least for recognition of a direct current difference $\Delta I$ and comprises one or more in particular cascaded cutoff elements which can interrupt the charging process if a predeterminable direct current cutoff difference is exceeded over a predeterminable cutoff period. In other words the invention relates to the provision of a charging station which comprises a rectifier means for converting the a.c. voltage based on a supply voltage network into a d.c. voltage and for charging an energy store of a vehicle, in particular a battery. The electric vehicle is connected to a plug socket of a vehicle by means of a contacting means, for example a connection cable of the power charging device, or by means of a connecting cable which can be plugged into a socket of the power charging device, in such a way that the externally generated charging d.c. voltage can be supplied to the electric vehicle.

In order to provide improved protection in the event of indirect contact and against fault currents, the power charging device comprises a residual current monitoring device which is designed to detect a direct current difference $\Delta I$, wherein the charging process is interrupted if a predeterminable direct current cutoff difference is exceeded over a predetermined cutoff period, the residual current monitoring device comparing at least the sum of the incoming current $I_1$ with the return current $I_2$ and determining from this a direct current difference $\Delta I$. If the direct current difference $\Delta I$ exceeds a predeterminable direct current cutoff difference $\Delta I_{max}$ and if this predeterminable direct current cutoff difference is exceeded over a predeterminable cutoff period $\Delta T$, the charging process is interrupted. If an external d.c. voltage is supplied to a power charging device and a fault current occurs, the charging process can thus be cut off in a reliable manner, in such a way that no fault currents flow and there are no undesired voltage potentials which, in the event of contact by an individual, may pose a dangerous risk. Fault currents, which cannot be detected by a conventional type A (alternating current differential fault) residual current device (RCD) and which pose a risk to humans, can thus be reliably detected. The power charging device is thus able to monitor a safe, i.e. nonhazardous charging process of an electric vehicle and can be subsequently integrated, for example, in a public charging pump which is already provided so as to satisfy or go beyond necessary safety standards. The residual current monitoring device is able to detect both fault currents in the feeding charging system and in the connected electric vehicle as well as in the charging cable between the current evaluation device and the electric vehicle, and can also reliably interrupt the charging process at predetermined cutoff currents and cutoff times for a direct current difference.

In accordance with an advantageous development of the invention, the residual current monitoring device is formed as a residual current monitoring device which is sensitive to all current, and is set up to recognise a direct current cutoff difference, an alternating current cutoff difference and a pulse current cutoff difference, the cutoff element being set up to interrupt the charging process when a predetermined direct, alternating or pulse current cutoff difference is exceeded over a predeterminable direct, alternating or pulse current cutoff time. This development thus recommends the use of a residual current monitoring device which is sensitive to all current and, for example, is modelled on a residual current device which is sensitive to all current, and can monitor direct, alternating and mixed currents or pulse currents, and interrupts the charging process when a respective specific current cutoff difference is exceeded over a predeterminable specific current cutoff time. In this instance it is advantageously conceivable for the current cutoff difference to be designed differently for a direct current, alternating current or pulse current difference, and the cutoff times for the different types of current can also be selected accordingly. D.c. voltages pose a considerably lesser risk to humans than a.c. voltages, so that the direct current cutoff difference can be selected to be greater than the alternating current cutoff difference or as a pulse current cutoff difference when increasing safety in the event of indirect contact, but also ensuring a reliable charging process. A direct current cutoff difference can accordingly be selected to be greater than a pulse current cutoff difference, and this can be selected to be greater than an alternating current cutoff difference. The same applies to the cutoff times. The cutoff times to be monitored can thus be selected to be of different lengths in order to ensure improved protection in the event of indirect contact and against damage or destruction of the motor vehicle electronics.

Proceeding from the aforementioned embodiment, in a further advantageous development the direct, alternating and pulse current cutoff differences have a substantially equal absolute effective value and the direct, alternating and pulse current cutoff times basically last for the same period of time. The internal structure of the residual current monitoring device can be simplified by selecting cutoff differences $\Delta I$ of equal magnitude over monitoring periods of equal length, the current cutoff difference and the current cutoff time having to be selected in such a way that reliable protection is provided to individuals, irrespective of the type of current, and charging can be carried out in a reliable manner. The measurement electronics arranged inside the residual current monitoring device can thus detect alternating, direct or mixed filter currents and can interrupt the charging process when the cutoff element is controlled with identical threshold values for all fault types.

In accordance with an advantageous development of the invention the power charging device may comprise a charge regulator means which can control a charging process specific to an energy store. The entire charge regulator electronics can thus be included in the power charging device, in such a way that the electric vehicle only has to comprise one direct current voltage connection point, which basically connects the power charging device directly to the energy store of the electric vehicle. This results in a saving for the electric vehicle in terms of weight and production costs and also makes it possible to design the power charging device using high-quality, durable and robust components which enable reliable rapid charging of the energy store.

Data from the energy store must be supplied to the power charging device in order to provide charge regulation specific to an energy store. For example this can be employed manually by inputting a numerical code or data entry, but an automatic transfer of energy-specific data is alternatively or additionally conceivable.

In accordance with an advantageous development of the invention the contacting means can comprise a data communication channel, in particular a power line connection or a serial data line connection, so as to transfer data between the vehicle and the power charging device. For example, charging data specific to the energy store such as nominal voltage, nominal charging power, charging capacity or the type of energy store can be transferred by means of such a data communication channel in order to adjust a charge regulator means comprised in the power charging device in accordance with the energy stores to be charged. In addition, further data such as average energy consumption, vehicle condition or the like can be transmitted to the power charging device which, for example, can be connected to a data communication network such as the Internet, which can supply transmitted data to a central server. As a result of power line data transfer, the live d.c. charge lines can be used for data transfer, in such a way that it is possible to dispense with special data communication lines or specially equipped contacting means. Irrespectively of this, one or more serial data line connections may be provided in the contacting means in order to transfer data between the electric vehicle and the power charging device.

Proceeding from the aforementioned embodiment, in accordance with an advantageous development of the data communication channel an exchange of data may be provided between an insulation monitoring means of the vehicle and the residual current monitoring device, and in particular at least one insulation resistance may be read out in order to predetermine a current cutoff difference and/or a cutoff time. Insulation monitoring means are generally installed in electric vehicles and permanently or periodically check the insulated state of the electric network relative to the vehicle chassis, i.e. the vehicle earth. The insulation monitoring means normally continuously check the insulated state of the onboard network by means of superposed pulse voltages, a.c. voltages or d.c. voltages in accordance with insulation monitoring methods known from the prior art, and constitute an indispensable safety component in an electric vehicle. For example, an insulation resistance $R_F$ of the vehicle can be read out by exchanging data of the insulation monitoring means with the residual current monitoring device of the power charging device, and can be used to adjust current cutoff differences and current cutoff times of the residual current monitoring device in such a way that an uninterrupted and more reliable charging process can take place. For example, in a vehicle which has a high insulation resistance $R_F$, low current cutoff differences and short current cutoff times can be set, and in vehicles which have a low insulation resistance $R_F$ and comprise corresponding fault currents, high current cutoff differences and long current cutoff times can be taken into consideration in order to carry out the charging process in a reliable manner.

Proceeding from the two aforementioned advantageous developments, it is possible in accordance with a further advantageous embodiment of the data communication channel to provide an exchange of data between an energy store control device of the electric vehicle and the charge regulator means, and in particular to transmit relevant energy store data such as charging voltage, charging current, charging capacity or the like to the charge regulator means of the power charging device in order to control the charging process. If a charge regulator means of a power charging device is integrated, data which is specific to the energy store, which must be taken into consideration by the charge regulator means for charging, can be read out automatically by an energy store control device in order to adjust the charge regulator means in such a way that an optimal charging current is provided for rapid charging of the energy store. It is further conceivable for the energy store control device to pass on further information, such as the capacity of the energy store, age of the energy store, maintenance requirements or other control and measurement data, to the power charging device in order to advantageously influence the charging process on the one hand and, on the other, to output warning or fault messages to the user or via a network to a server.

In accordance with a further advantageous development of the invention the residual current monitoring device can be unipolar and can recognise both a current difference in the current direction from the power charging device to the electric vehicle, and a current difference in the current direction from the electric vehicle to the power charging device. Such a unipolar residual current monitoring is particularly expedient if the battery power of the vehicle can be provided for power supply in a power grid. With a greater number of vehicles to be fed, a load compensation in particular can thus be achieved in large power grids. In this regard such a feed is conceivable, in particular with vehicles which have their own energy-producing means, for example solar cells or braking energy recovery generators which can charge inside an energy store, excess energy being fed back to the power charging device and thus to the power grid. In addition, mobile emergency power units or "chargers" with a correspondingly high power charging capacity are conceivable which can feed energy into isolated power grids, for example power grids which are supported by energy generation which is not continuously available, such as wind energy of photovoltaics. In this instance the differential currents can be monitored in both possible current directions—on the one hand to charge the electric vehicle and on the other to supply excess energy to the power charging device. In terms of circuitry, it should be taken into consideration in this instance that the residual current monitoring device has to be supplied, at least in part, with energy in order to carry out its functions, in such a way that in this case current would have to be tapped, possibly before and after the cutoff element, in order to supply the residual current monitoring device.

In accordance with a further advantageous configuration of the invention the contacting means comprise a protective conductor connection which can produce a potential connection between earth of the power charging device and the vehicle earth, and the residual current monitoring device can comprise a contacting fault unit for determining a contacting fault, a short circuit fault and/or an examination fault which may, during fault determination, activate the cutoff element to interrupt the charging process. This development thus recommends that by means of the contacting means, for example by means of a charging cable with a plug and a socket or a charging cable which is rigidly fixed to the power charging device and/or the electric vehicle, a potential connection can be produced between the reference earth of the power charging device and the reference earth of the vehicle, in such a way that in this case a fault current can flow between the power charging device and the vehicle. The contacting means monitors the correct connection of the contacting means in terms of polarity, in such a way that a connection is produced which is protected against reverse polarity, and can also output a short circuit fault, for example in the event of a short circuit between earth and one or two live conductors, or a contacting fault, for example in the event of a poor connection of the earth line or a poor connection of a live conductor, and can activate the cutoff element in such a way that the charging process can be interrupted. Electrical safety is thus considerably increased since, in addition to the monitoring of a differential fault by the residual current monitoring device in the power charging device, a contacting fault unit is also provided which, in the event of a reverse polarity fault, a short circuit or a contact fault, can cut off the charging process.

In accordance with a further advantageous configuration the power charging device may comprise a vehicle test means which can selectively activate electric vehicle components when monitoring a current difference in order to check the function and status of the insulation monitoring means inside the vehicle. The vehicle test means can thus control the insulation monitoring means located in the vehicle via the data communication channel in order to check the function of said insulation monitoring means and/or to activate substantially electric components of the vehicle via the insulation monitoring means in order to carry out self-testing, preferably in terms of insulation strength, the occurrence of fault currents, short circuits or contacting difficulties. In this instance it is conceivable for the vehicle test means to contact at least the insulation monitoring means in order to read out safety-relevant data, and/or to read out or, for test purposes, activate further electrical equipment and safety devices of the vehicle in order to check the electrical condition of the onboard vehicle network. If error messages are received or detected by the vehicle test means, it may further be possible to cut off the charging process in order to rule out any risk posed to individuals and to prevent further damage to the vehicle electronics or power charging device. The power charging device thus already uses monitoring and test devices arranged in the vehicle to check the electrical condition, the protection afforded to individuals and to the vehicle thereby being increased further and it being possible to charge the electric vehicle in a safe and reliable manner.

In accordance with an advantageous development of the invention the residual current monitoring device may comprise a summation current transformer for detecting a direct, alternating and pulse current difference and/or an overcurrent monitoring means for defining a charging current. In order to determine differential currents, the residual current monitoring device must measure at least the current in an incoming path of a charging circuit and the current in a return path of a charging circuit. In this instance there are different conventional possibilities for measuring current. For example resistors can be connected in the current path and the voltage drop can be measured. However, a precise determination is made via an inductive transformer system which comprises an indirectly measuring summation current transformer which can measure the sum of the incoming and return currents by determining a magnetic field surrounding the conductor, the summation current transformer being designed in such a way that it can measure direct, alternating and pulse current differences. Such summation current transformers are already prior art when used in residual current devices (RCDs) and can advantageously be used in a power charging device.

Proceeding from the embodiment above it may further be advantageous if the residual current monitoring device for detecting a current difference comprises a summation current transformer comprising two measurement windings each with an equal number of turns, a push-pull oscillator, an oscillator control unit, a compensation current filtering means and a differential current analysis unit. The measurement windings can be connected as vibration inductances of the push-pull oscillator, and the push-pull oscillator can uniformly traverse a B/H characteristic curve (flux density/field strength characteristic curve/hysteresis characteristic curve) of a yoke of the summation current transformer by means of a compensation current which can be produced by the oscillator control unit, it being possible to split the compensation current through the compensation current filtering means into a direct current difference portion and an alternating current difference portion, and to monitor said compensation current by the differential current analysis unit for an overshoot of a predeterminable direct current and/or alternating current cutoff difference over a predeterminable cutoff time. If the current cutoff difference is exceeded during a predeterminable cutoff time, the differential current analysis unit can activate the cutoff element in order to interrupt the charging process, the cutoff element interrupting the supply of direct current to the vehicle. The residual current monitoring device consequently operates by the principle of a magnetic compensation which is adapted for detection of direct, alternating and mixed currents. The two windings each with an equal number of turns N located on the summation current transformer are connected in the oscillating circuit of the push-pull oscillator as inductors in order to produce oscillation. The characteristic curve of the yoke of the summation current transformer is constantly traversed by the vibration of the push-pull oscillator until it is in the saturation range. Direct current magnetisations are thus compensated. In order to control the push-pull oscillator an oscillator control unit generates a compensation current which can be directly proportionally influenced by the a.c. and d.c. portions of the current difference. This compensation current can be separated electronically in accordance with current type by a compensation current filtering means and evaluated, the differential current analysis unit possibly triggering the cutoff element if a predeterminable value of a current difference, for example depending on current type (direct current difference, pulse current difference, alternating current difference or differences between mixed current types) is exceeded, or if a predeterminable value of an absolute current difference for all current types is exceeded, so that the charging process is interrupted. Based in the principle of known residual current devices (RCDs), a residual current monitoring device can thus be proposed which can provide a reliable charging process, which poses no risk to individuals, for an electric vehicle.

DESCRIPTION OF THE DRAWINGS

Further advantages will emerge from the following description of the drawings. The drawings illustrate embodiments of the invention. The drawings, the description and the claims contain numerous features and combinations. The person skilled in the art will also advantageously consider the features individually and combine them further in an expedient manner.

For example, in the drawings.

EMBODIMENTS OF THE INVENTION

In the figures, like or similar components are denoted by like reference numerals.

Figure 1:
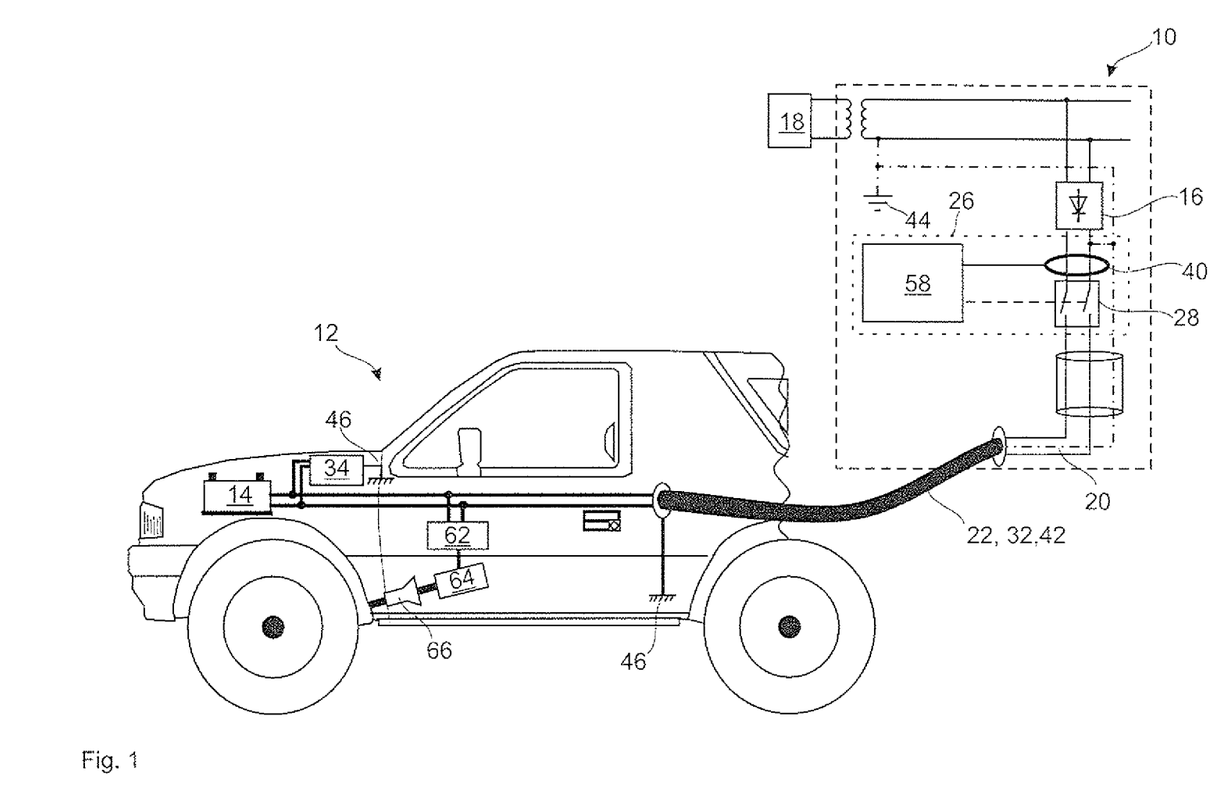
FIG. 1 is a schematic view of a first embodiment of a power charging device with an electric vehicle connected.

FIG. 1 is a schematic view of a first embodiment of a power charging device 10, which is connected in this instance to a rechargeable battery of an electric vehicle 12 in order to charge an energy store 14. The power charging device 10 is connected by means of a contacting means 22, which comprises a connection cable and contacts a plug connection terminal on the side of the power charging device 10 and a socket connection terminal on the side of the electric vehicle 12. The contacting means 22 further comprises a data communication channel which, by means of a PWM modulated signal, modulates data over a live conductor for charging the energy store 14. The contacting means 22 further comprises a protective conductor connection 42 which connects the earth 44 of the power charging device to the vehicle earth 46, which is formed by the vehicle chassis, in order to produce an equipotential bonding.

In the electric vehicle 12 the contacting means 22 is directly connected to the energy store 14 for charging, the two live conductors 14 being constantly monitored for their insulation resistance to earth 46 by means of an insulation monitoring means 34 which is likewise connected to the vehicle earth 46. If there are defects in the insulation to earth 46, the insulation monitoring means 34 can display a warning and cut off the energy store 14 at predetermined insulation resistances. Furthermore, an inverter 62 with a connected electric motor 64 for generating a drive force of the vehicle is connected to the live conductors of the onboard network, the electric motor 64 being able to drive the wheels of the vehicle 12 via a mechanical gear system 66.

The power charging device 10 is coupled to an energy supply voltage network 18 by means of a transformer and, on the secondary side of the transformer, comprises an earth connection 44 to the housing of the power charging device 10, to which an equipotential bonding line of the charging d.c. voltage 20 is also connected. The power charging device 10 comprises a residual current monitoring device 26 which comprises a cutoff element 28, a summation current transformer 40 and a residual current analysis unit 58. The cutoff element 28 may, for example, be a cutoff protection, but can also be a cascaded two-stage or multi-stage cutoff element which, for example, may comprise an overcurrent cutoff means, such as thermal cutoff contacts such as bending metal tripping devices or electromagnetic cutoff contacts for overcurrent, as well as a cutoff protection for separation at high differential currents, but may also comprise two or more cutoff protections in series in order to increase cutoff reliability at high currents. The transformer a.c. voltage is converted by means of a rectifier means 16, for example a bridge rectifier circuit or an electronic network part, into the charging d.c. voltage 20 and is forwarded on to the contacting means 22 via the cutoff element 28 in order to charge the vehicle 12. During charging the all-pole switching contacts of the cutoff element 28 are closed. The summation converter 40 is arranged on the input side to the cutoff element 28 and compares the sum of the incoming and return currents $I_1$ and $I_2$ for charging the energy store 14 of the vehicle 12 and derives from this a current difference $\Delta I$ which is monitored by means of the differential current analysis unit 58. For this purpose the residual current monitoring device 26 is formed in such a way that direct current differences, alternating current differences and alternating current difference superposed by direct current can be monitored for any overshoot and, in the event of an overshoot of a current cutoff difference over a predetermined cutoff time, the cutoff element 28 is cut off in such a way that the charging process is interrupted. For this purpose the differential current analysis unit 58 of the residual current monitoring device 26 comprises both conventional electromechanical components as well as electronic active components, which can be consulted in order to determine a d.c. voltage difference. In this instance it may be that a d.c. power supply has to be provided in order to operate the residual current monitoring device 26, in order to ensure monitoring at least of the direct current difference $\Delta I$.

Figure 2:
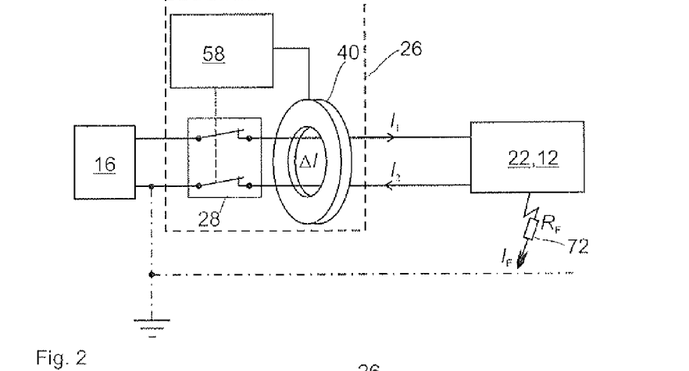
FIG. 2 is a schematic block diagram of a residual current monitoring device of an embodiment of a power charging device according to the invention.

FIG. 2 shows a block diagram of the internal structure of an embodiment of a residual current monitoring device 26 which can be used in a power charging device 10 according to the invention. The residual current monitoring device 26 is connected directly behind a rectifier means 16 in a power charging device 10 and monitors the difference between an incoming current $I_1$ and a return current $I_2$, which flows via a contacting means 22 towards an electric vehicle 12 with an integrated charge regulator means. The difference between the incoming current $I_1$ and the return current $I_2$ is denoted as $\Delta I$ and can be collected by a summation current converter 40, from which a differential current analysis unit 58 can determine a current difference $\Delta I$. If the effective value of the current difference $\Delta I$ permanently exceeds a current cutoff difference during a predetermined cutoff time, the differential current analysis unit 58 prompts the cutoff element 28 to cutoff the direct current supply to the electric vehicle 12, in such a way that the charging process is interrupted. If a fault current $I_F$ caused by an insulation resistance $R_F$ 72 occurs inside the contacting means 22, which produces the electrical connection between the power charging device 10 and the electric vehicle 12, or inside the electric vehicle 12, there is a current difference $\Delta I$ between $I_1$ and $I_2$ which is determined by the magnitude of the insulation resistance $R_F$ and the voltage level of the charging voltage with respect to earth. Depending on the magnitude of the fault current $I_F$ and thus the magnitude of the fault voltage produced, the current difference $\Delta I$ varies, the residual current monitoring device 26 interrupting the charging process at a specific magnitude and predeterminable cutoff time so there is no risk of any dangerous voltage upon contact, and damage or destruction of the vehicle electronics can be avoided.

Figure 3:
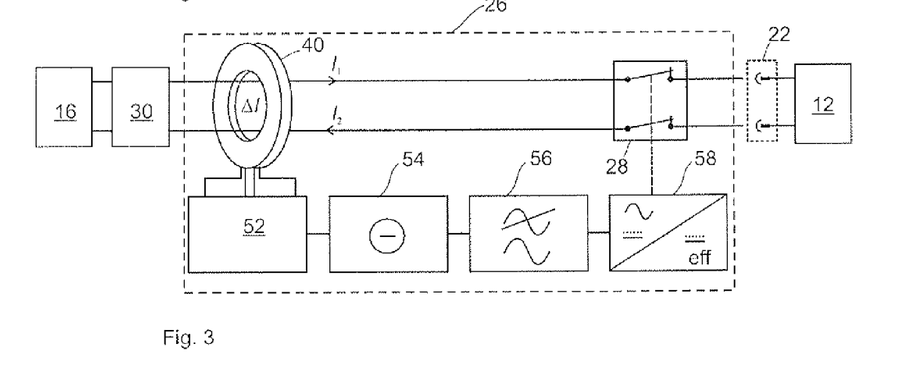
FIG. 3 is a block diagram of a further residual current monitoring device for a power charging device according to the invention.

FIG. 3 shows a further block diagram of an internal structure of a residual current monitoring device 26 which is designed to determine both d.c. voltage differences and a.c. voltage differences as well as mixed current differences. In this case the residual current monitoring device 26 of a power charging device 10 is connected behind a rectifier means 16 and a charge regulator means 30, the power control means 30 controlling the charging current in such a way that optimal charging of an energy store 14 of the electric vehicle 12 is ensured. The incoming current $I_1$ is galvanically connected to the energy store 14 of the electric vehicle 12 via a contacting means 22, which connects the power charging device 10 to the electric vehicle 12 via a plug-in coupling system. The return current $I_2$ likewise flows through the residual current monitoring device 26. A summation current transformer 40 is arranged inside the residual current monitoring device 26 and can determine the difference between the incoming and return currents $I_1$ and $I_2$, and from this can provide a current difference $\Delta I$. In order to determine direct current and alternating current differences, the summation current transformer 40 comprises two measurement windings each having an equal number of turns N, which are controlled by a push-pull oscillator 52, whereby a magnetic excitation is generated in the yoke of the summation current transformer in order to uniformly traverse the B/H hysteresis characteristic curve 60 (flux density-field strength characteristic curve) of the summation current transformer (shown in an idealised manner in FIG. 4). Each winding of the summation current transformer 40 forms an inductive element of a resonant circuit of the push-pull oscillator 52, the push-pull oscillator 52 being controlled by means of an oscillator control unit 54 and it being possible for a compensation current to be extracted which characterises the symmetrical traversing of the B/H characteristic curve. From this compensation current, which is generated by the oscillator control unit 54, it is possible to extract, by means of a compensation flow filtering means 56, a direct current differential portion $\Delta I_=$ and an alternating current differential portion $\Delta I_\sim$ which can be monitored over a predetermined cutoff time $\Delta T_=$, $\Delta T_\sim$ by means of a differential current analysis unit 58 for any overshoot of a predeterminable direct current and/or alternating current difference $\Delta I_{MAX=}$, $\Delta I_{MAX\sim}$. If the effective value of the current difference $\Delta I$ permanently exceeds the current cutoff difference $\Delta I_{MAX}$ within the predeterminable time interval $\Delta T$, the differential current analysis unit 58 will activate the cutoff element 28 on order to interrupt the charging process. For this purpose the measuring electronics 52, 54, 56 and 58 of the residual current monitoring device 26 require an internal power supply, which can be obtained for example by tapping from the d.c. voltage circuit, or may also be provided by means of a battery.

Figure 4:
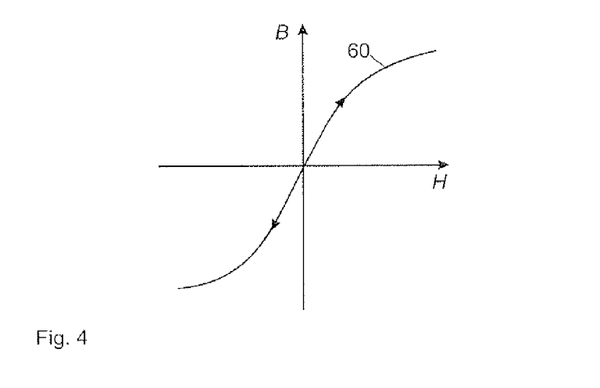
FIG. 4 shows an idealised hysteresis characteristic curve of a yoke of a summation current transformer.

FIG. 4 shows an idealised view of a B/H flux density/field strength characteristic curve of a low-loss magnetising yoke of a summation current converter 40, this view being idealised and therefore comprising no hysteresis losses. The push-pull oscillator 52 of the residual current monitoring device 26 of FIG. 3 generates an oscillating vibration, in such a way that the characteristic curve of the yoke is traversed by the vibration frequency as far as the saturation range. There is thus compensation of direct current magnetisations. The compensation flow generated by the oscillator 52 is influenced proportionally by the a.c. and d.c. portions of the differential current and can be evaluated electronically by means of the oscillator control unit 54, compensation current filtering means 56 and differential current analysis unit 58 in order to determine a current difference. In contrast to the aforementioned active summation current transformer 40, a type A summation current transformer of a conventional residual current device (RCD) or of a known residual current monitoring device (RCM) operates as a current transformer which converts the differential current $\Delta I$ in accordance with the number of turns N. A measurement voltage $U_M$ of the magnitude $U_M = R_B * \Delta I / N$ is thus produced over a measuring resistor $R_B$. The aforementioned type A residual current devices (RCDs) known from the prior art are not suitable for detection of direct currents or alternating currents with direct current fractions, since their transducer can only detect changes in alternating current and does not offer any protection in the event of direct fault currents, which are only permissible to a low level.

Figure 5:
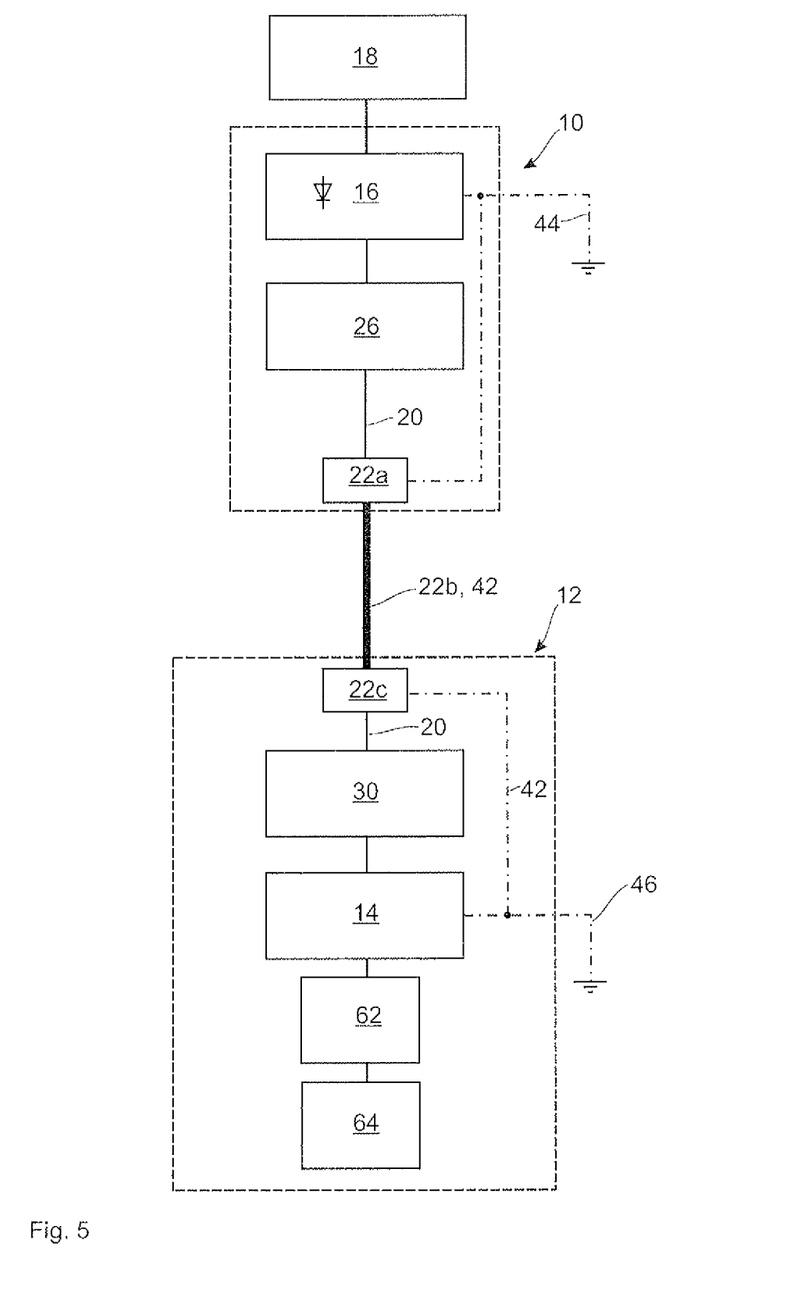
FIG. 5 is a block diagram of a further embodiment of a power charging device with an electric vehicle connected.

FIG. 5 shows an embodiment of a power charging device 10 in the form of a block diagram, which device is connected to an electric vehicle 12. The power charging device 10 is connected to a supply voltage network 18. A rectifier means 16 is comprised within the power charging device 10 and produces a charging d.c. voltage 20 from the a.c. voltage of the supply voltage network 18. Furthermore, a live conductor of the d.c. voltage 20 going out from the rectifier means 16 is connected on the housing side to an earth 44 of the power charging device 10 so as to produce a reference earth. The d.c. voltage 20 of the rectifier means 16 is guided via a residual current monitoring device 26 which can determine a current difference $\Delta I$ and, if a current cutoff difference $\Delta I_{MAX}$ is exceeded, can cut off the charging process. In order to power the electric vehicle 12, the direct current conductors carrying the charging current are guided via a contacting means 22, which comprises a socket 22a, a connection line 22b and a jack connector 22c and produces an electrical connection between the power charging device 10 and the electric vehicle 12. A charge regulator means 30 is arranged inside the electric vehicle 12 and controls the course of the charging current and the course of the charging voltage in a manner adapted to the specific requirements of the energy store 14, and carries out regeneration charging and rapid charging of the energy store 14. A protective conductor connection 42 is also produced between the earth of the power charging device 44 and the vehicle earth 46 via the contacting means in order to generate an equipotential bonding and a common reference potential. The charge regulator means 30 charges the energy store 14 and the energy store 14 can supply an electric motor 64 via an inverter 62 with electric energy so as to drive the vehicle 12.

Figure 6:
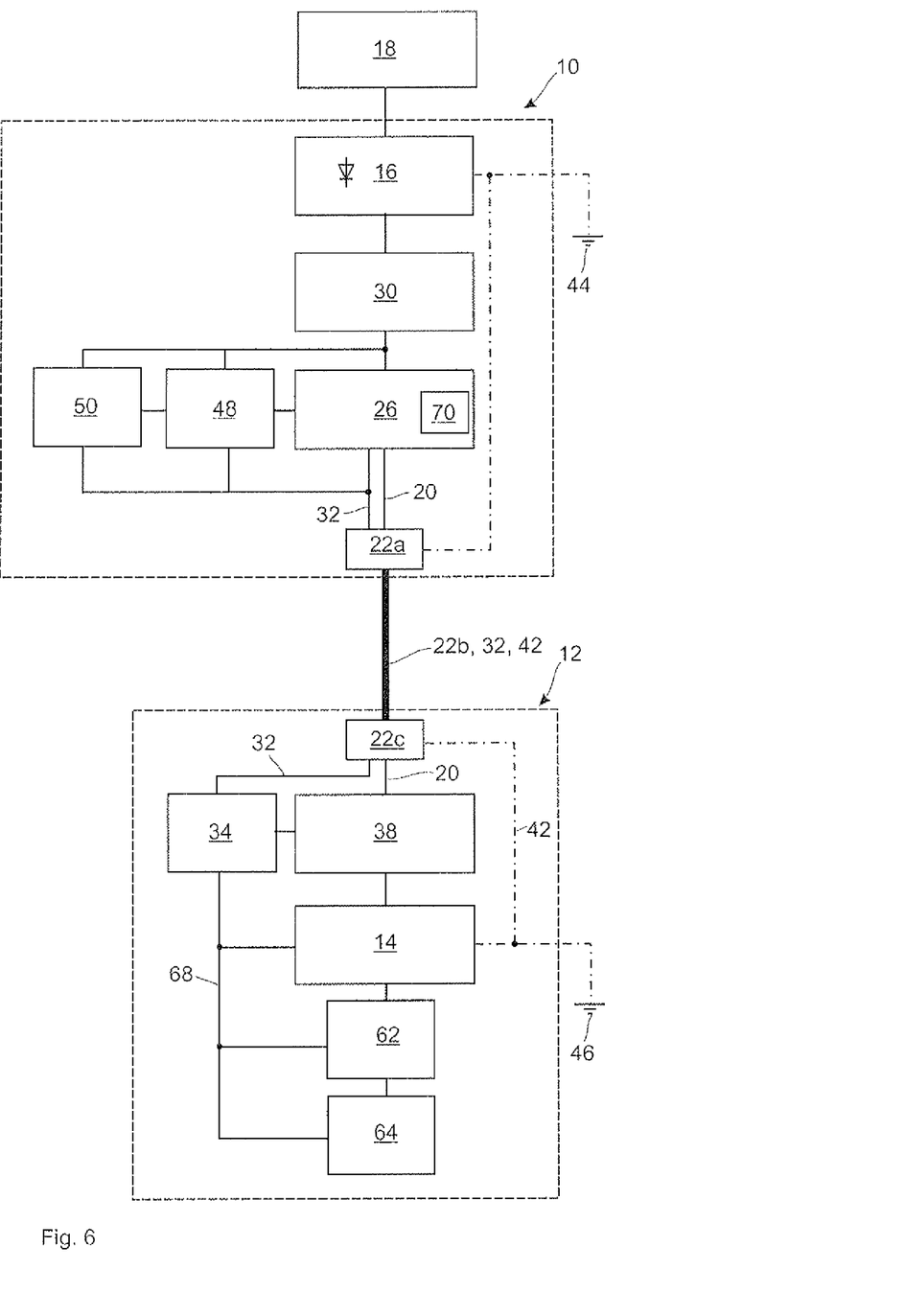
FIG. 6 is a block diagram of a further embodiment of a power charging device with an electric vehicle connected.

FIG. 6 lastly shows a further embodiment, in the form of a block diagram, of a power charging device 10 connected to an electric vehicle 12. The power charging device 10 is connected to a power supply network 18 at the input side, the alternating current supplied from the supply voltage network 18 being converted into direct current by a rectifier means 16, and the rectifier means 16 producing an earth 44 of the power charging device 10 by earthing a live conductor of the d.c. voltage circuit 20. The d.c. voltage conductors are guided through a charge regulator means 30 which provides a corresponding charging current and charging voltage when aware of specific properties of the energy store 14 and, for example, can provide pulsed regeneration charging or ramped controlled charging of the energy store 14 of the electric vehicle 12. The live conductors are then guided through a residual current monitoring device 26 which can detect a direct current, alternating current or pulse current difference $\Delta I$ produced and can compare it with values for current cutoff differences $\Delta I_{MAX}$ over current cutoff periods $\Delta T$ stored in a memory 70, in accordance with which the charging process is interrupted if the current differences $\Delta I$ permanently exceed the cutoff differences $\Delta I_{MAX}$ over the current cutoff periods $\Delta T$. In parallel to this, a contacting fault unit 48 and a vehicle test means 50 are arranged inside the power charging device 10 which are also contacted with the residual current monitoring device 26 and can cut off the charging process. The contacting fault unit 48 monitors the contacting means 22 and can detect short circuits, reverse polarity or contacting faults, for example in the event of high transition resistances, can emit warning signals and can cut off the direct current supply 20 to the electric vehicle 12. In addition, the vehicle test means 50 can communicate via a data communication channel 32, which is produced by the contacting means 22, with an insulation monitoring means 34 inside the vehicle 12 in order to check the insulation condition of the vehicle network and to self-test substantially electrical equipment assemblies of the vehicle 12. For this purpose the contacting means 22 galvanically connects the power charging system 10, for example via a plug-in coupling system inside the power charging device 10, to the onboard network of the electric vehicle 12 through a connection cable 22b and a plug-in coupling system 22c on the side of the electric vehicle 12. The contacting means 22 transfers both the charging current of the conductor carrying the d.c. voltage for charging the energy store 14 of the electric vehicle 12, and data via connection lines of the data communication channel 32, for example via a serially operating data line, or via power-line-coded high frequency signals, modulated to the live d.c. voltage lines, Lastly, the contacting means 22 comprises a protective conductor connection 42 for connecting the earth 44 of the power charging device 10 to the vehicle earth 46 of the electric vehicle 12.

Inside the electric vehicle 12 an energy store control device 38 controls the energy store 14 and can, for example, transmit energy-specific data, such as charging capacity, nominal current consumption and charging voltage of the energy store 14, to the power charging device 10 in order to adjust the charge regulator means 30. Furthermore, the energy store control device 38 can transmit further data, such as remaining residual capacity of the energy store 14, maintenance information or similar data, to the power charging device 10. The power charging device 10 can be connected via a network connection to a data network, for example Internet, in order to transmit information regarding its own operating state and regarding the operating state of the respectively connected vehicle to a remote server of a vehicle manufacturer or a service workshop. The data communication channel 32 of the contacting means 22 is connected to an insulation monitoring means 34 in order to transmit to the power charging device 10 data of the insulation monitoring means 34 or data for self-testing of key equipment assemblies of the vehicle. For this purpose the insulation monitoring means 34 is connected to electrical equipment assemblies and devices, such as an energy store control device 38, energy store 14, inverter 62 and electric motor 64, in order to monitor their insulation resistance relative to the vehicle earth 46. The energy store 14 is connected directly to the energy store control device 38 for charging, the energy store 14 comprising a direct earth connection to the vehicle chassis in order to form a vehicle earth 46. The vehicle earth 46 is connected via the protective conductor connection 42 of the contacting means 22 to the earth 44 of the power charging device 10. The energy store 14 supplies an inverter 62 with voltage, in such a way that this can provide a PWM-modulated voltage for driving an electric motor 64 in order to drive the vehicle 12 in the driving state. The key electrical components of the electric vehicle 12 can be monitored eclectically via the insulation monitoring means 34, it being possible to forward this data, via the data communication channel 32, on to the power charging device 10, where it can be analysed by a vehicle test means 50. If the values exceed critical ranges, the charging process can be cut off by means of the residual current monitoring device 26. The contacting fault unit 48 monitors the fault-free electric connection of the contacting means 22 between the power charging device 10 and the electric vehicle 12.

The invention prevents the occurrence of fault currents in a d.c. voltage supply of a vehicle, which currents pose a risk to humans and cannot be detected by conventional residual current devices (RCDs) since, for example, fault currents afflicted with alternating current are superposed by high direct currents. A safe and reliable charging process of an electric vehicle can be monitored and carried out by means of the residual current monitoring device comprised in the power charging device. The residual current monitoring device can be retrofitted in public charging pumps and goes beyond the provisions of the current valid safety standard.

The invention claimed is:

1. A power charging device for an electric vehicle with an electric energy store, comprising:
   (a) at least one rectifier means for converting a supply voltage into a charging d.c. voltage;
   (b) a contacting means for contacting a plug-in connection supply point of the electric vehicle; and
   (c) a residual current monitoring device for detecting a current difference in the contacting means and/or in the electric vehicle during a charging process of the energy store of the electric vehicle,
   wherein the residual current monitoring device is designed at least for detection of a direct current difference ΔI and comprises one cutoff element which can interrupt the charging process when a predeterminable direct current cutoff difference is exceeded over a predeterminable cutoff time.

2. The power charging device according to claim 1, wherein the residual current monitoring device is sensitive to all current, and is set up to recognize a direct current cutoff difference, an alternating current cutoff difference and a pulse current cutoff difference, wherein the cutoff element is set up to interrupt the charging process when a predetermined direct, wherein the alternating current cutoff difference or the pulse current cutoff difference is exceeded over a predeterminable direct, alternating or pulse current cutoff time.

3. The power charging device according to claim 2, wherein the direct, alternating and pulse current cutoff differences have a substantially equal absolute effective value and the direct, alternating and pulse current cutoff times basically last for the same period of time.

4. The power charging device according to claim 1, wherein the power charging device further comprises a charge regulator means which can control an energy-specific charging process.

5. The power charging device according to claim 4, wherein the contacting means comprises a data communication channel, in particular by means of a power line connection or a serial data line connection.

6. The power charging device according to claim 5, wherein the data communication channel provides an exchange of data between an insulation monitoring means of the electric vehicle and the residual current monitoring device, and in particular at least one insulation resistance $R_F$ may be read out in order to predetermine a current cutoff difference and/or a cutoff time.

7. The power charging device according to claim 5, wherein the data communication channel provides an exchange of data between an energy store control device of the electric vehicle and the charge regulator means, and in particular can read out relevant energy store data such as charging voltage, charging current, charging capacity and the like in order to control the charging process.

8. The power charging device according to claim 1, wherein the residual current monitoring device is unipolar and can recognize both a current difference in the current direction from the power charging device to the electric vehicle, and a current difference in the current direction from the electric vehicle to the power charging device.

9. The power charging device according to claim 1, wherein the contacting means comprises a protective conductor connection which can produce a potential connection between an earthing of the power charging device and an earthing of the electric vehicle, and the residual current monitoring device can comprise a contacting fault unit for determining a contacting fault, a short circuit fault and/or reverse polarity fault which may, during fault determination, activate the cutoff element to interrupt the charging process.

10. The power charging device according to claim 1, wherein the power charging device further comprises a vehicle test means which can selectively activate electric vehicle components when monitoring a current difference in order to check at least the function of an insulation monitoring means inside the vehicle.

11. The power charging device according to claim 1, wherein the residual current monitoring device comprises a summation current transformer for detecting a direct, alternating and pulse current difference and/or an overcurrent monitoring means for defining a charging current.

12. The power charging device according to claim 11, wherein the summation current transformer comprises:
   (i) two measurement windings each with an equal number of turns;
   (ii) a push-pull oscillator;
   (iii) an oscillator control unit;
   (iv) a compensation current filtering means; and
   (v) a differential current analysis unit,
   wherein the measurement windings is connected as vibration inductances of the push-pull oscillator, and the push-pull oscillator is able to uniformly traverse the B/H characteristic curve of a yoke of the summation current transformer by means of a compensation current which can be produced by the oscillator control unit, so as to split the compensation current through the compensation current filtering means into a direct current difference portion and an alternating current difference portion, and to monitor said compensation current by the differential current analysis unit for an overshoot of a predeterminable direct current and/or alternating current cutoff difference over a predeterminable cutoff time, in accordance with which the differential current analysis unit can activate the cutoff element to interrupt the charging process.

13. The power charging device according to claim 6, wherein the data communication channel provides an exchange of data between an energy store control device of the electric vehicle and the charge regulator means, and in particular can read out relevant energy store data such as charging voltage, charging current, charging capacity and the like in order to control the charging process.

* * * * *